(12) United States Patent
Manders

(10) Patent No.: US 6,513,866 B1
(45) Date of Patent: Feb. 4, 2003

(54) OPEN ROOF CONSTRUCTION FOR A VEHICLE

(75) Inventor: Peter Christiaan Leonardus Johannes Manders, Horst (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/702,429

(22) Filed: Oct. 31, 2000

(30) Foreign Application Priority Data

Nov. 1, 1999 (NL) .............................. 1013443
Dec. 6, 1999 (NL) .............................. 1013756

(51) Int. Cl.$^7$ .............................. B60J 7/047
(52) U.S. Cl. .................. 296/216.02; 296/223; 296/224; 296/216.03
(58) Field of Search ................ 296/216.03, 223, 296/224, 216.02

(56) References Cited

U.S. PATENT DOCUMENTS

| | | | | |
|---|---|---|---|---|
| 4,647,106 A | * | 3/1987 | Furst | 296/223 |
| 5,288,125 A | * | 2/1994 | Huyer | 296/224 X |
| 5,325,585 A | * | 7/1994 | Sasaki et al. | 296/224 X |
| 5,879,049 A | | 3/1999 | Sinelli | 296/223 |

FOREIGN PATENT DOCUMENTS

EP  0 543 427 A  5/1993

* cited by examiner

Primary Examiner—Dennis H. Pedder
(74) Attorney, Agent, or Firm—Westman, Champlin & Kelly, P.A.; S. Koehler

(57) ABSTRACT

An open roof construction for a vehicle for a vehicle having an opening in its fixed roof comprises a stationary part to be fixed to the roof. The stationary part includes at least one stationary guide rail at the edge of the roof opening, which extends in the longitudinal direction of vehicle. A panel is adjustable between a closed position, in which it closes the roof opening, and an open position, in which it has been moved rearwards to an upwardly sloping position at least partially above the fixed roof, in which position it opens the roof opening at least partially, An operating mechanism is provided for adjusting said panel. The operating mechanism includes a driven slide and a panel element, preferably a link plate, which is attached to the panel and which is adjustably connected to said slide. A locking mechanism is provided. The locking mechanism includes a locking element that is slidably connected to the panel element. The locking element can be locked to the guide rail in the closed position of the panel, preferably via a cam-slot connection, and which can be actuated by means of a connecting arm that is connected to the slide. The connecting arm is movably and pivotally connected to the panel element and it extends at least substantially vertically in the upwardly pivoted position of the panel.

6 Claims, 17 Drawing Sheets

OPEN ROOF CONSTRUCTION FOR A VEHICLE

BACKGROUND OF THE INVENTION

The invention relates to an open roof construction of the spoiler roof type. An open roof construction of this kind is known from DE-A-3408056. The connecting arm of the construction disclosed therein is guided along the panel element at the front end and at the rear end and it actuates a pivoting locking element by sliding movement.

Another open roof construction is known from EP-A-0 543 427. Therein, the operating mechanism consists of a lifting arm having a forcing guide. In the lifted position of the panel, the lifting arm is substantially vertical. The lifting arm performs a double function, that is for lifting the panel and for operating a locking element with which the panel is locked in the closed position.

SUMMARY OF THE INVENTION

The object of the invention is to provide a new spoiler roof.

According to one aspect of the invention the connecting arm is movably and pivotally connected to the link, and it extends at least substantially vertically in the upwardly pivoted position of the link. In this manner, the connecting arm acts not only as an actuating element for the locking element, but also as a supporting element for the panel in the upwardly pivoted position thereof in addition to the already available support of the operating mechanism. This leads to a stable support of the panel.

This arrangement is particularly advantageous in the situation where the operating mechanism comprises a link-cam connection interconnecting the slide and the link wherein a link rib is formed on one side of the link and the link cams are formed on the slide. The link ribs engage around the link rib, while the connecting arm is disposed on the opposite side of the link. The connecting arm provides support for the link on the side of the link that faces away from the link-cam connection. Tilt loads on the link are thus avoided without any additional parts being required for that purpose.

BRIEF DESCRIPTION OF THE DRAWINGS

The invention will be explained in more detail hereafter with reference to the drawings, which schematically show an exemplary embodiment of the open root construction according to the invention.

DETAILED DESCRIPTION OF THE ILLUSTRATIVE EMBODIMENTS

Figure 1:
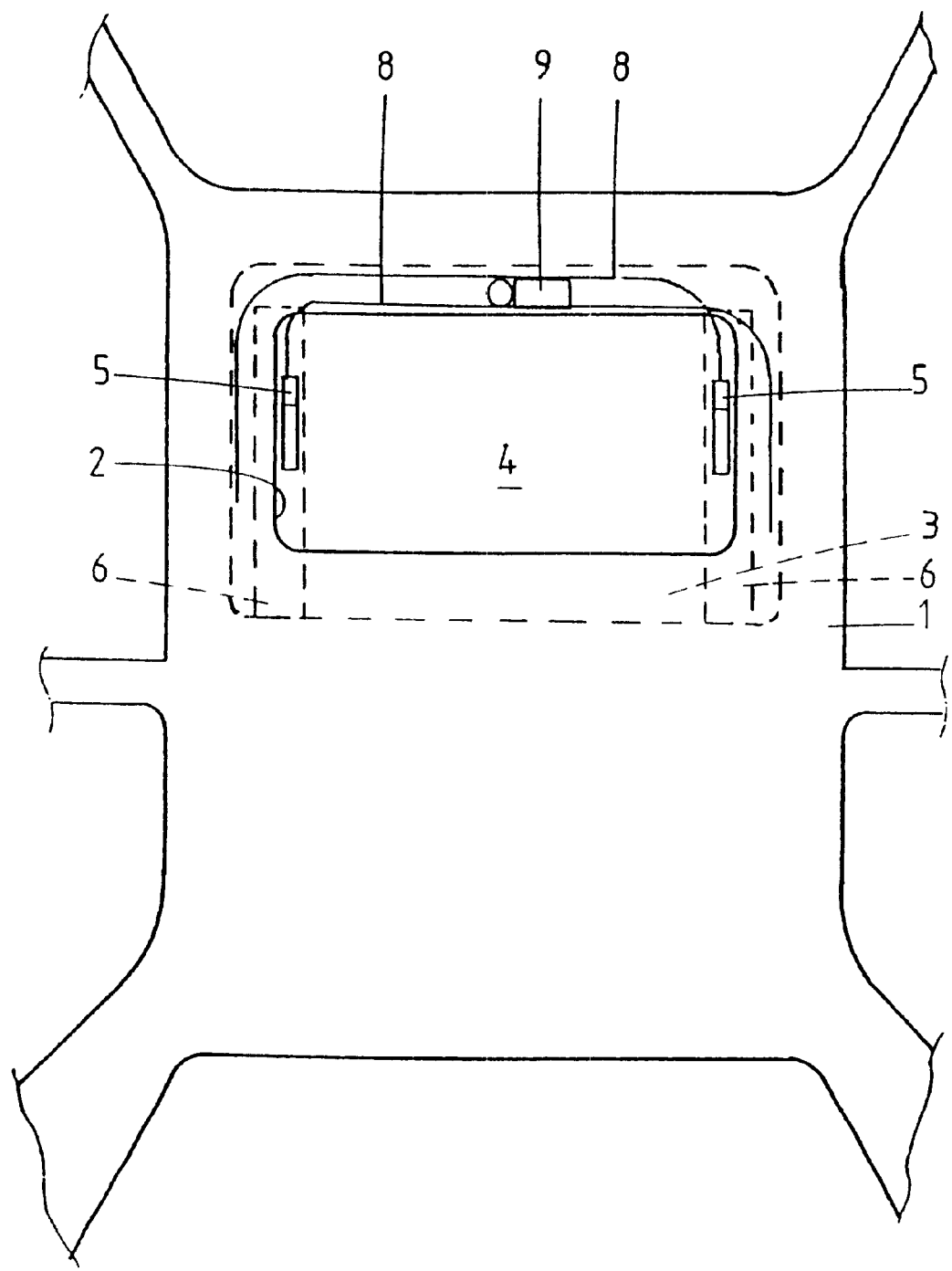
FIG. 1 is a plan view of a roof of a motor vehicle fitted with the open roof construction according to the invention.
Figure 2:
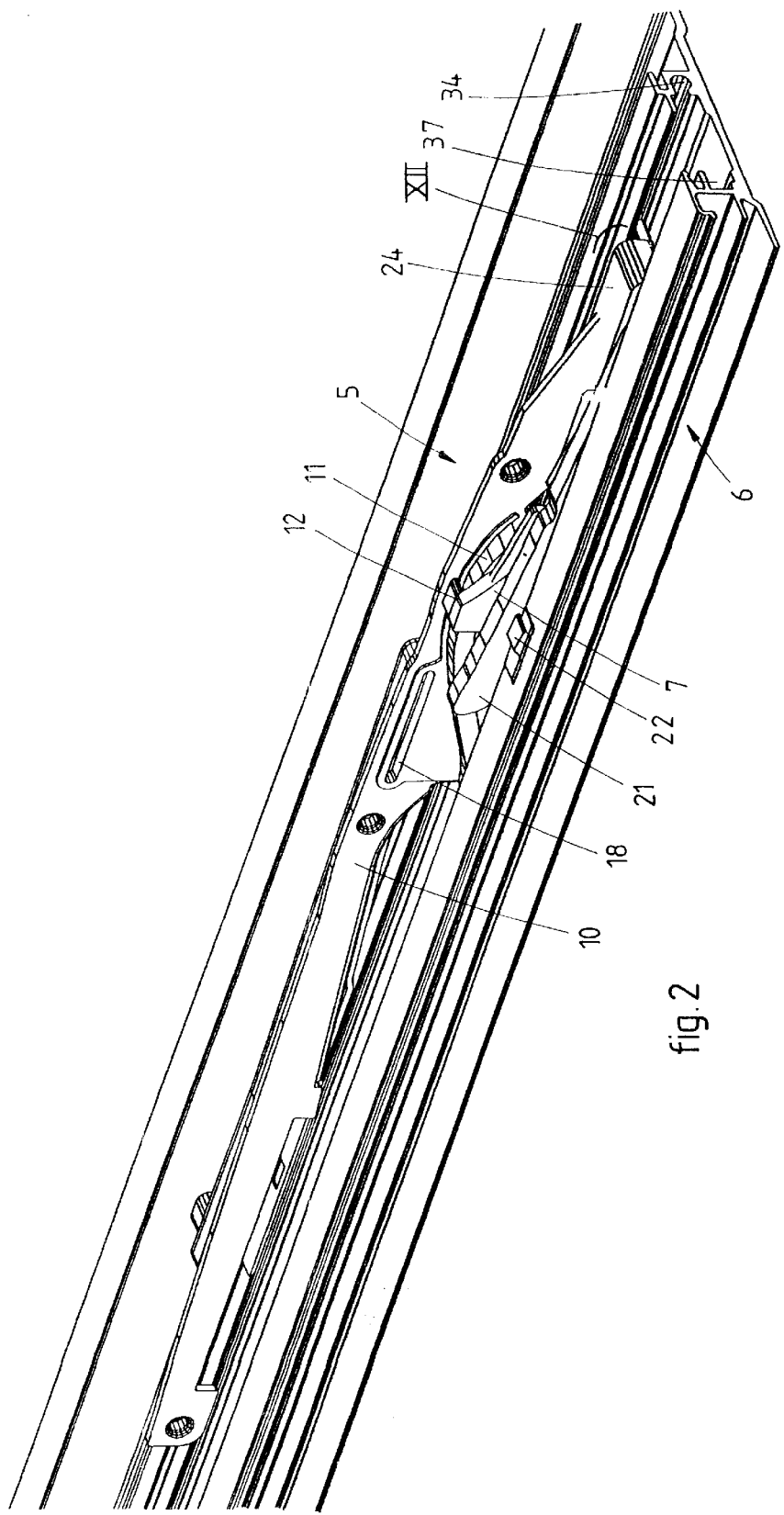
FIG. 2 is a larger-scale perspective view, seen from one side, of one of the guide rails with an operating mechanism of the open roof construction of FIG. 1, wherein the panel is shown in the closed position.
Figure 3:
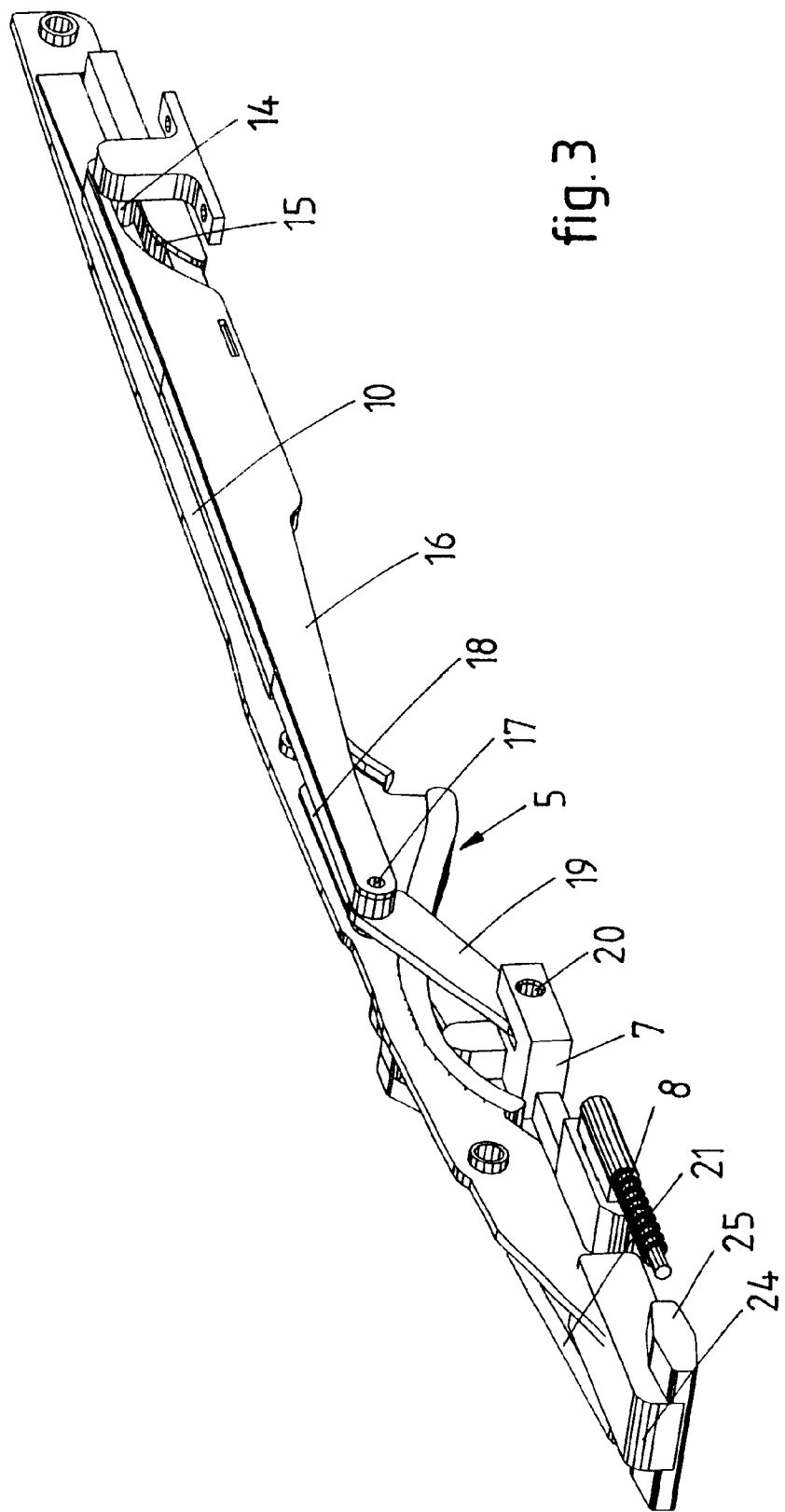
FIG. 3 shows the operating mechanism of FIG. 2, seen from the other side.
Figure 4:
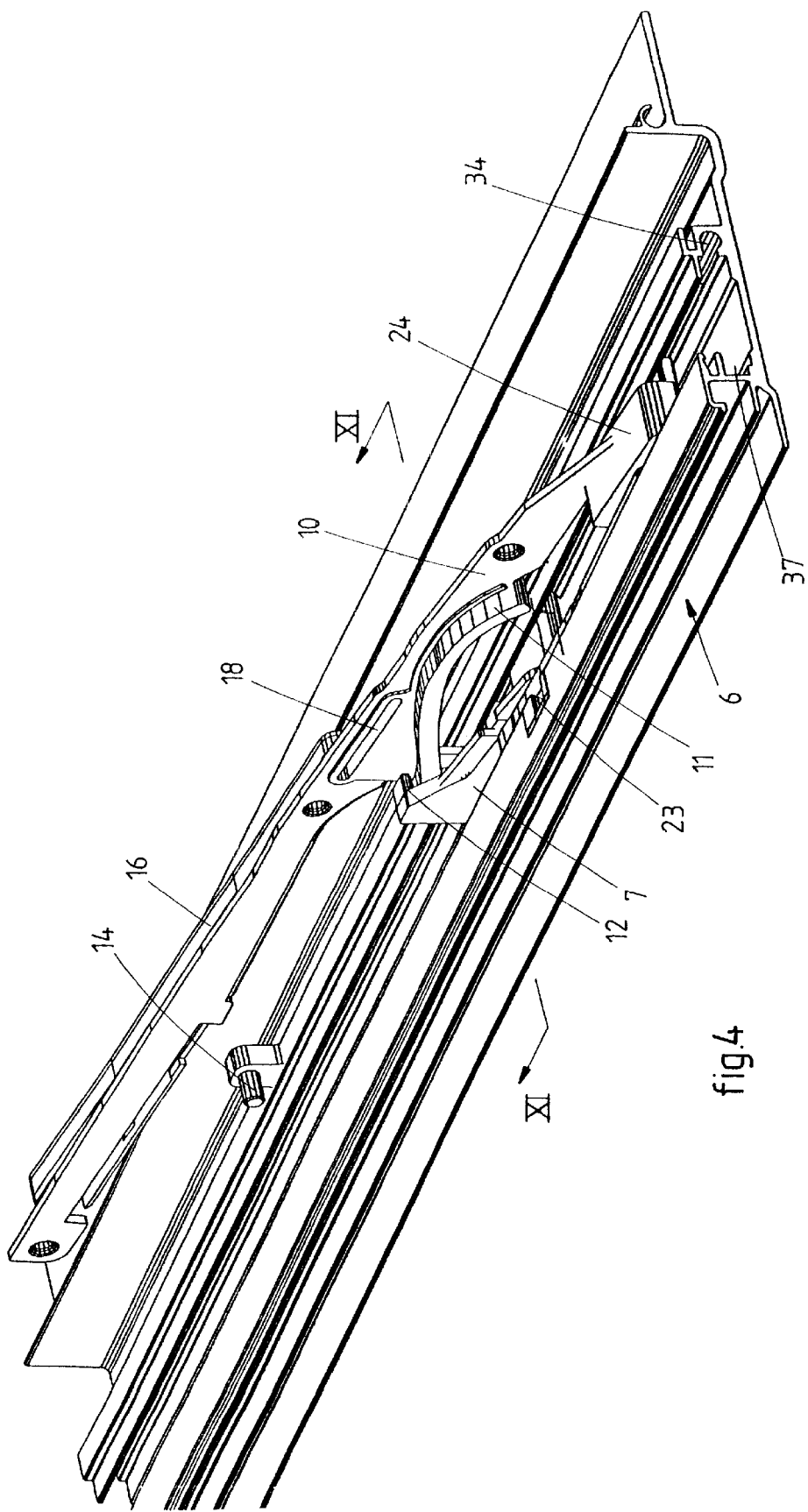
FIGS. 4 and 5 are views corresponding to FIGS. 2 and 3 of the operating mechanism with the panel in the ventilating position.
Figure 5:
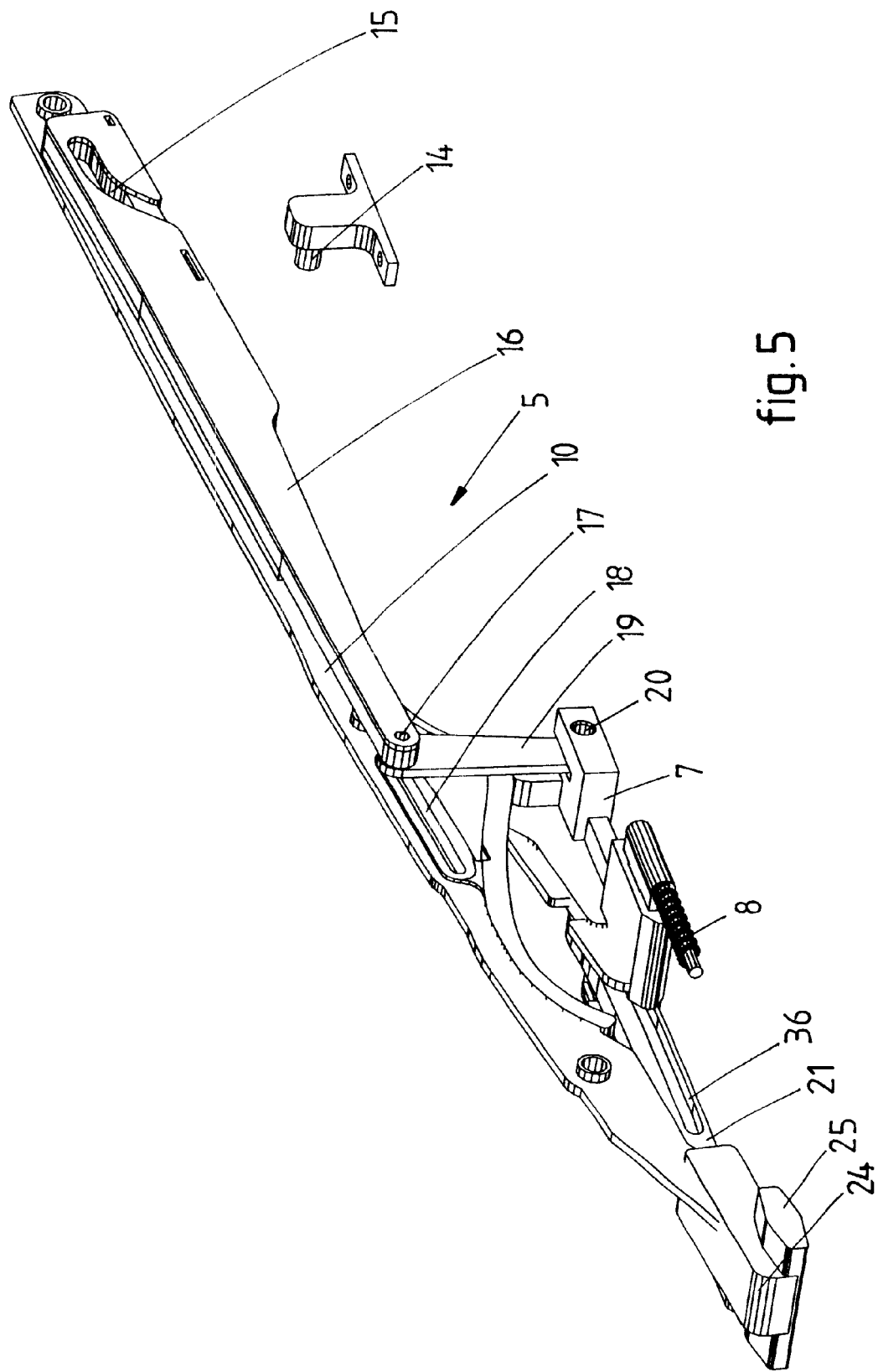
Figure 6:
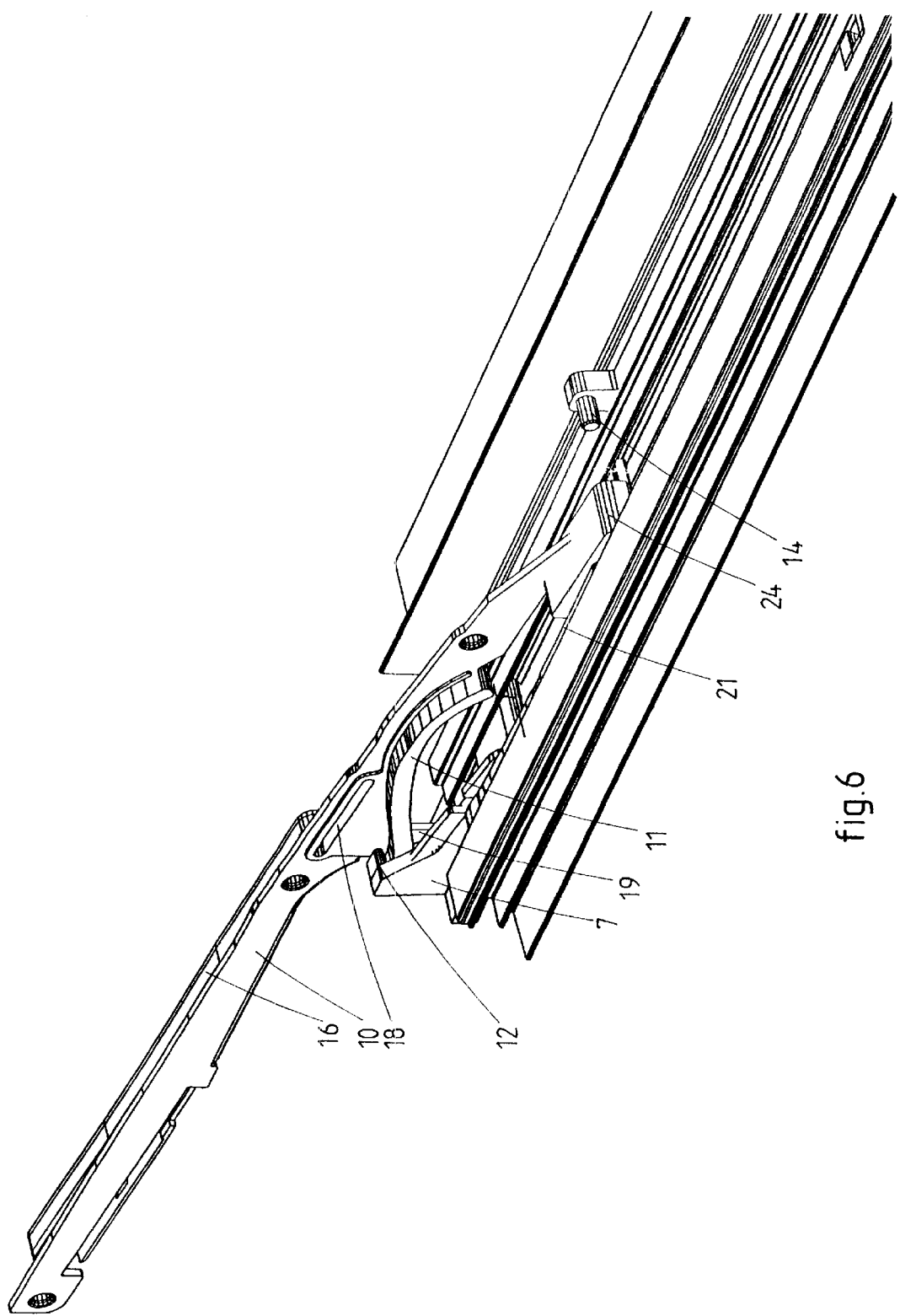
FIG. 6 is a view corresponding to FIG. 2, wherein the operating mechanism for the panel is in its rearwardly moved position.
Figure 7:
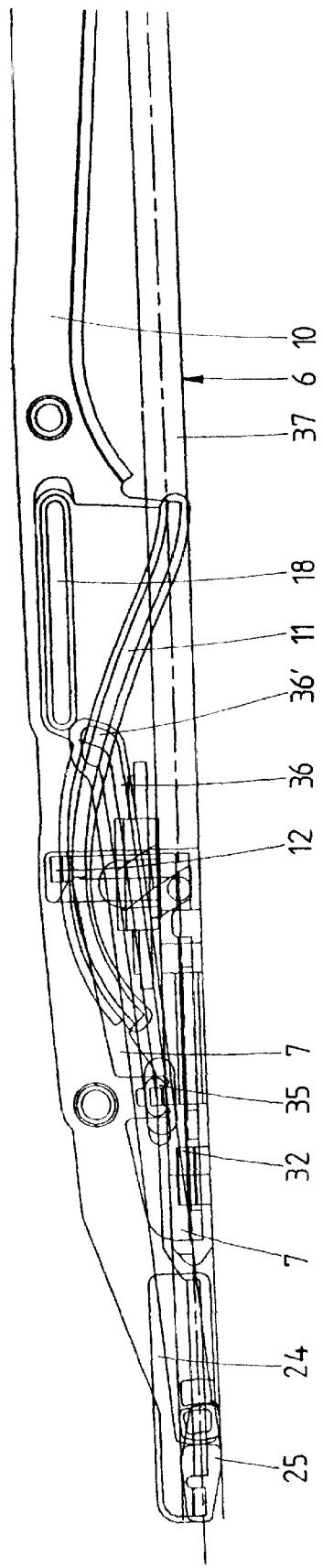
FIGS. 7–10 are transparent side views of a part of the operating mechanism of FIG. 2, showing various positions thereof.
Figure 8:
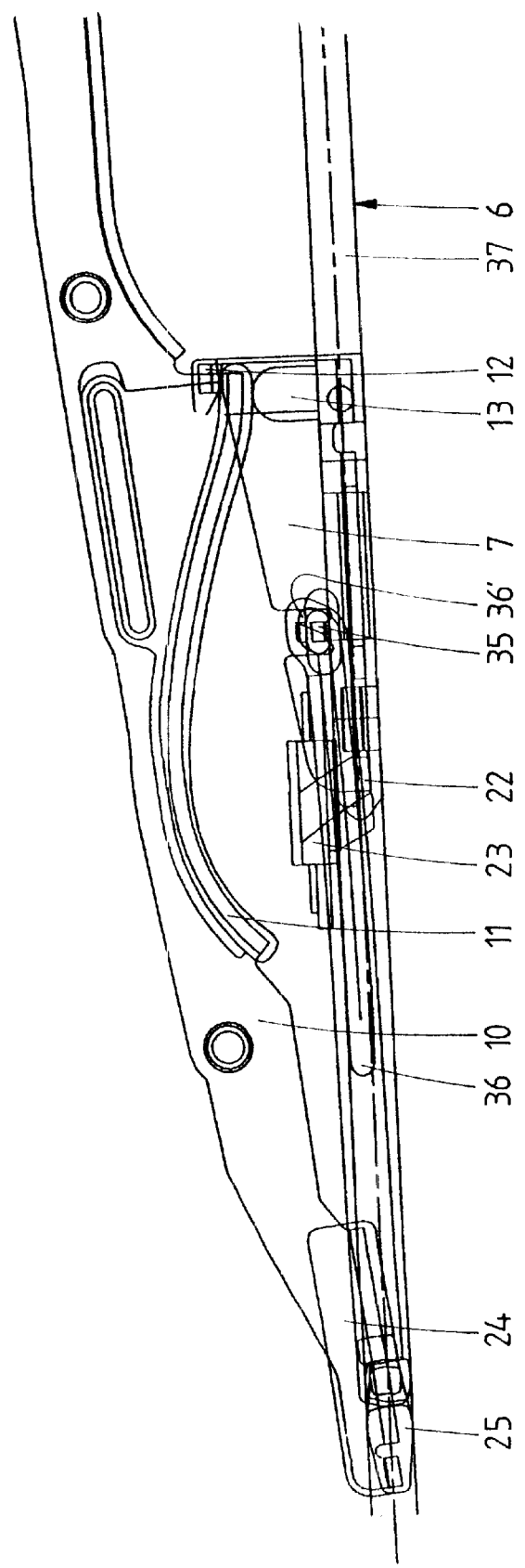
Figure 9:
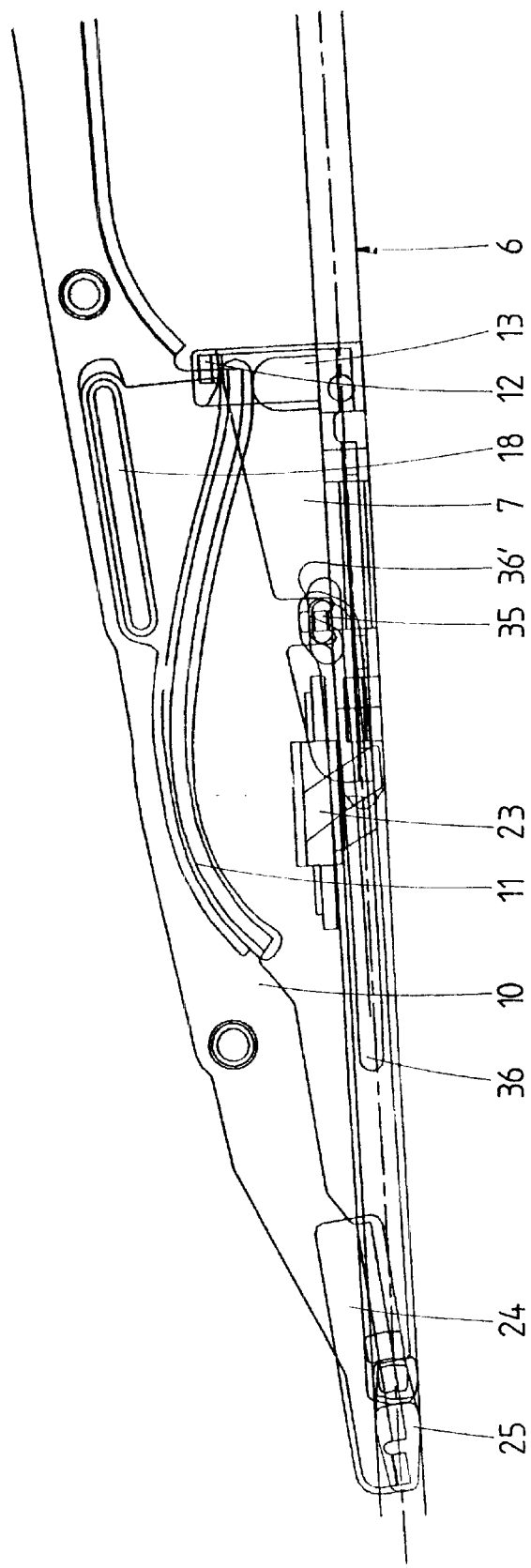
Figure 10:
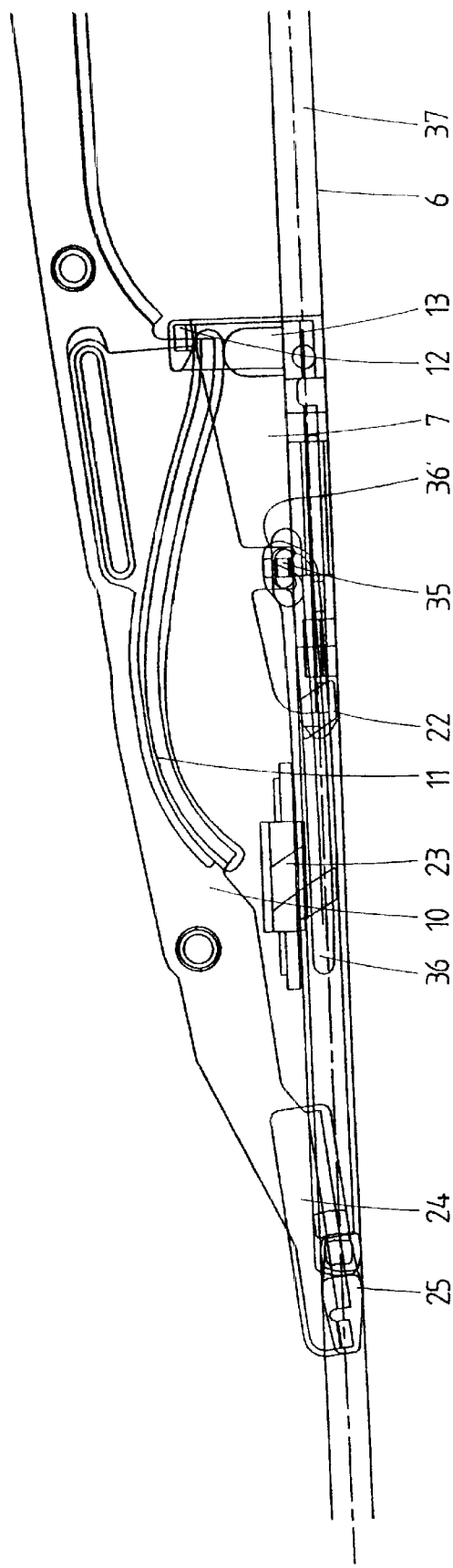
Figure 11:
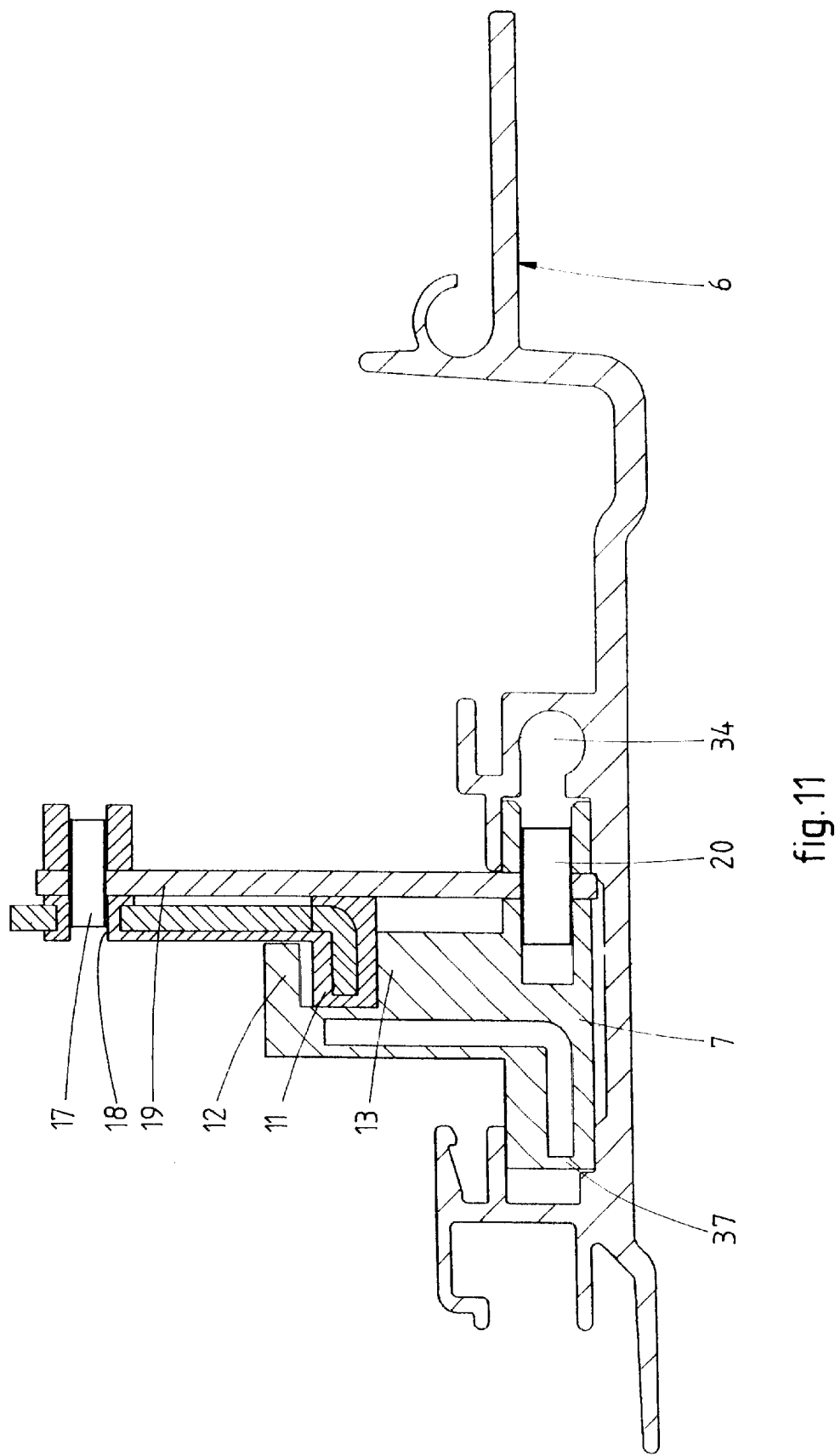
FIG. 11 is a larger-scale sectional view along line XI—XI in FIG. 4.
Figure 12:
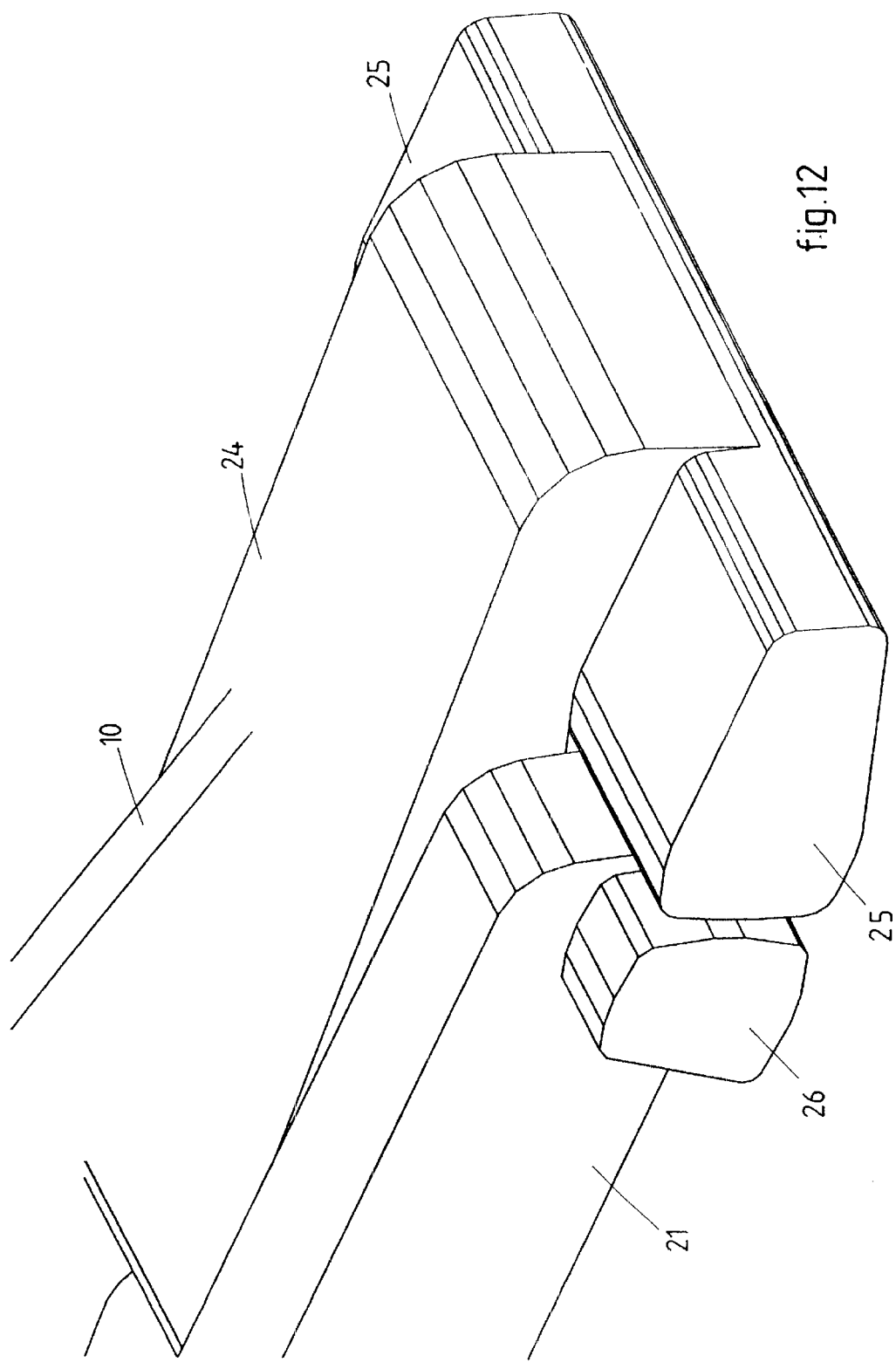
FIG. 12 is a larger-scale detail view of the operating mechanism of FIG. 2.

The drawings, and in the first instance FIGS. 1–3, show an exemplary embodiment of the open roof construction according to the invention, which is built into a vehicle, in whose fixed roof opening 2 is present. The open roof construction comprises a frame 3 or different stationary part, which can be attached to the fixed roof 1 or form part thereof. Said frame 3 supports, in a manner to be described in more detail hereafter, a closure element 4 which is capable of selectively closing the roof opening 2 or releasing it at least partially.

In the illustrated embodiment the open roof construction is a so-called spoiler root, wherein the closure element 4 is in the form of a rigid, preferably at least partially transparent panel; which can be moved from the closed position in roof opening 2, first to an upwardly sloping ventilating position and from there in a rearward direction to a position above the fixed roof 1, thus releasing the roof opening 2 an the front side of the panel 4.

In order to enable these movements, panel 4 is fitted with an operating mechanism 5 at both longitudinal edged, whereby the two operating mechanisms 5 may be identical, for example, or each other's mirror image. Said operating, mechanisms 5 are accommodated in guide rails 6, which are mounted in frame 3 or integrated therein and which extend under fixed roof 1 on either side of the roof opening 2. Each operating mechanism 5 is actuated by a slide 7 (see FIG. 17), which is guided in the guide rail 6 and which can be moved along th guide rail 6 by means of an associated pull-push cable 8 or other connecting element connected to a driving unit such as an electric motor 9, a crank handle or the like.

FIGS. 2–17 show one of said operating mechanisms 5 in more detail.

Each operating mechanism 5 comprises a link plate 10, which is attached to the stiffening frame of panel 4 in a well-known manner. Link plate 10 is in engagement with slide 7 for the purpose of effecting the movements of panel 4. In this embodiment the link plate 1 includes a link rib 11 on one side, around which link cams 12, 13 of slide 7 engage. Both the link cams 12, 13 and the link rib 11 are formed by enveloping (laterally flanged) metal parts of link plate 10 and slide 7, respectively, in plastic by means of an injection molding process, as a result of which a very solid construction is obtained without any loose parts that require additional mounting steps.

The operating mechanism 5 furthermore includes a locking mechanism for locking panel 4 in its closed position, is in particular on the rear side thereof, on the one hand in order to seal the panel properly against the fixed roof 1 and on the other hand in order to protect the panel from being broken open on the rear side. After all, the engagement between link rib 11 and link cams 12, 13 takes place relatively far to the front. The locking mechanism 5 includes a locking cam 14 formed on or attached to stationary guide rail 6, which comes into engagement in the closed position of the panel 4 with a locking slot 15, which is formed in an elongate locking element 16.

The front sloping part of the locking slot, 15 defines part of the vertical adjusting range of panel 4 as a result of the engagement between cam 14 and slot 15. In connection therewith link cams 12, 13 are formed such that link rib 11 is capable of movement between cams 12, 13, while link plate 10 undergoes angular displacement simultaneously therewith, without any play being created between rib 11 and cams 12, 13 as long as pin 14 is not in engagement with slot 15 yet. At the point on link rib 11 where the engagement between pin 14 and slot 15 has been effected, the thickness of link rib 11 decreases, as a result of which some play is created between rib 11 and cams 12, 13. The advantage of this is that the same mechanism can be used with open roof constructions having straight guide rail 6 and open roof constructions having curved guide rails 6. The play between rib 11 and came 12, 13 offsets this.

Locking element 16 is movable along link plate 10 by means of a longitudinal guide (not shown), and at the front end it is in engagement with a slot 18 in link plate 10 by means of a pin 17. Said slot 18 defines the adjusting range of locking element 16.

Pin 17 also serves to provide the pivoted connection with a connecting arm 19, which is pivotally connected to slide 7 at its lower end by means of a pivot 20. Said pivoting arm 19 not only functions to actuate locking element 16, but also to support panel 4, in particular in the raised position thereof. In that case the connecting arm 19 extends at least substantially vertically, or at least substantially perpendicularly to panel 4, so that forces being exerted on said panel can be directly transmitted to guide rail 6 by the connecting arm 19, substantially without any flexural forces being exerted on connecting arm 19. Since the connecting arm 19 is mounted on the side of link plate 10 remote from link rib 11, no disadvantageous torques will develop on link plate 10 when forces are exerted on panel 4, since link plate 10 is supported on both sides. The pivoting movement of connecting arm 19 upon actuation of the locking element 16 automatically provides a reduction between the driving slide 7 and locking element 16, as a result of which only a short slot 18 in link plate 10 is required, so that a strong and compact construction is obtained. The connecting arm 19 also occupies a rearwardly and upwardly inclined position in the closed position of the panel 4, wherein the connecting member 19 can be pivoted upwards when the panel 4 is being moved from its closed position, thus acting as a retarding element between said slide 7 and said locking element 16, as a result of which movement of the slide 7 is converted into a smaller movement of said locking element 16, at least during part of the actuation of the locking element 16.

In the frontmost position of panel 4, the link plate 10 must be locked against movement with respect to side rail 6 more or less, and to this end a locking element 21 is provided, which is fitted with a locking cam 22 which mates with a locking recess 23 in guide rail 6. Locking recess 23 slopes upwards in forward direction.

Locking element 21 is controlled by slide 7. To this and a cam 35 is formed on slide 7, preferably by enveloping a flanged metal part of slide 7 in plastic by means of an injection molding process. The elongated locking element 21 includes an elongate control slot 36, with which cam 35 is in constant engagement. In the rearward positions of panel 4, locking element 21 extends horizontally and locking cam 22 is retained in vertical direction in a groove 37 of guide rail 6. Cam 35 is retained in horizontal direction in a deflected part 36' of slot 36, so that locking element 21 is locked in position with respect to slide 7 and moves along with said slide. In the frontmost position of panel 4, cam 22 can move upwards in the locking recess, thus enabling movement of cam 35 through slot 36 simultaneously with the downward pivoting movement of locking element 21. Said locking element is more or less locked in position with respect to guide rail 6 in that position.

Normally such a locking element 21 mates with a front sliding shoe of operating mechanism 5, which is capable of forward and backward sliding movement in guide rail 6. In the present a embodiment, however, the front end 24 of link plate 10 includes integrated sliding shoes 25, which function as hinges for link plate 10 and which also function as front guides of operating mechanism 5 in guide rail 6. The sliding shoes 25 can comprise a projecting metal part enveloped in plastic, for instance, by injection molding.

The front end 24 of link plate 10 and the locking element 21 must allow each other[s ]movements in vertical direction, therefore. On the other hand, locking element 21 and link plate 10 must abut against each other in such a manner as to be capable of transmitting large forces in horizontal direction.

FIGS. 12–15 show the front end 24 of link plate 10 and the front end of locking element 21. As can be seen in the figure, the rear part of sliding shoe 25 has been left out on one side of the front end 24 of link plate 10, so as to make room for locking element 21.

Figure 13:
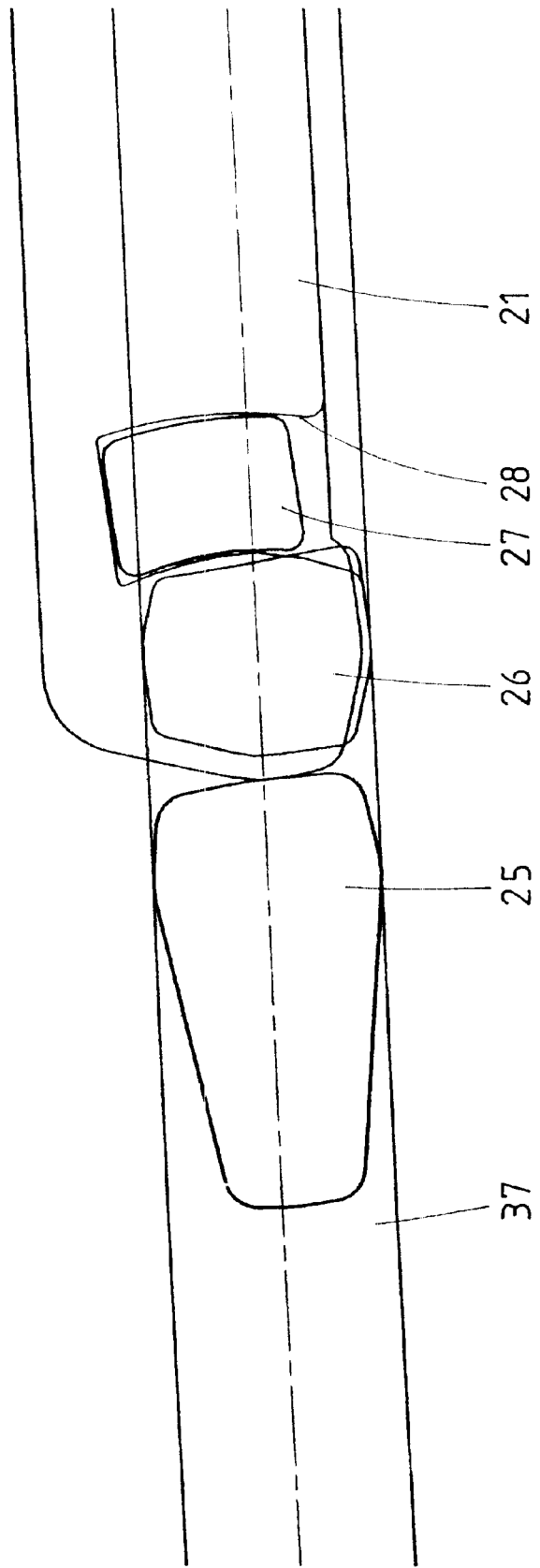
FIGS. 13–15 are transparent side views of the detail of the operating mechanism of FIG. 12, showing various positions thereof.
Figure 14:
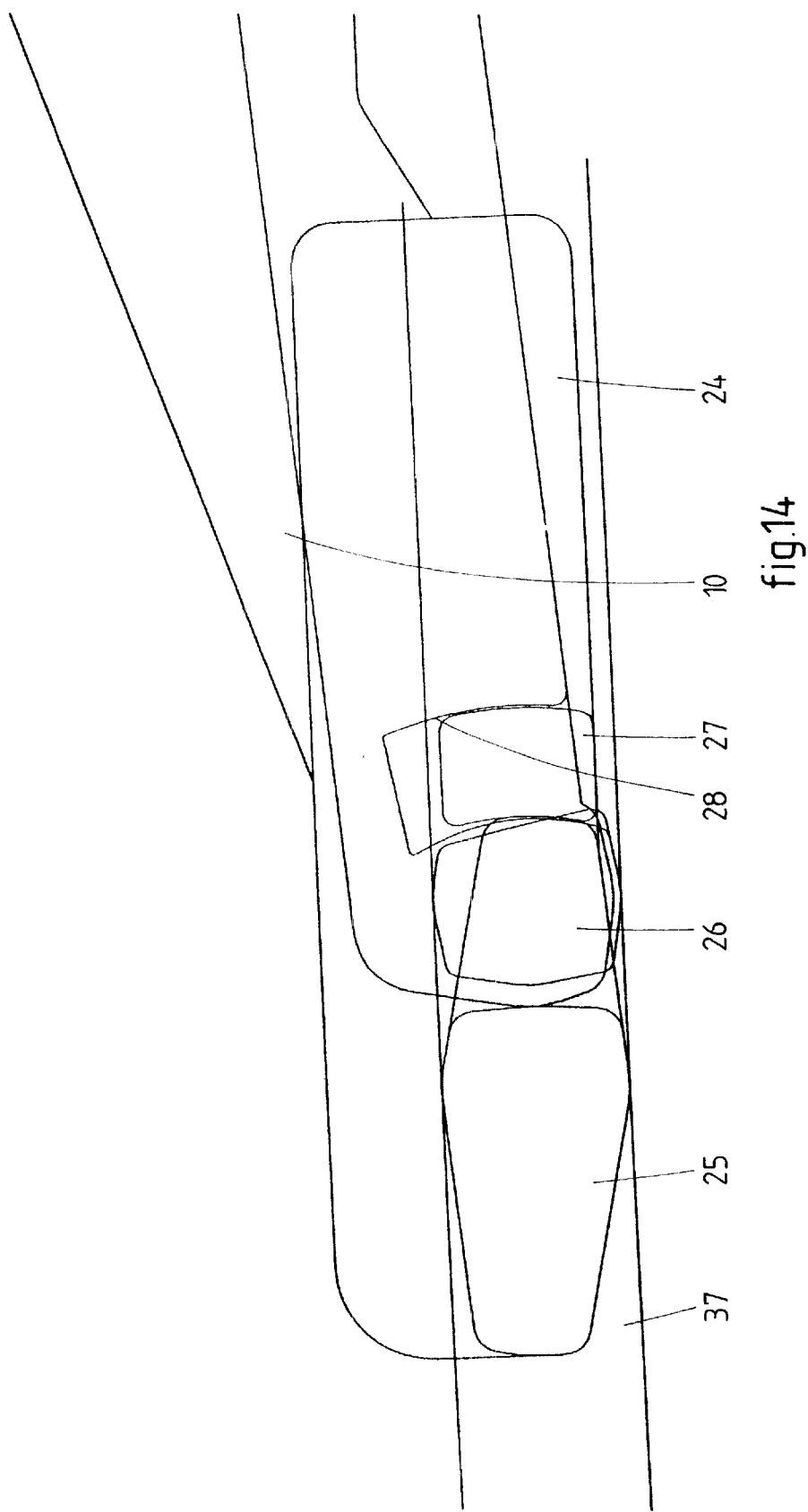
Figure 15:
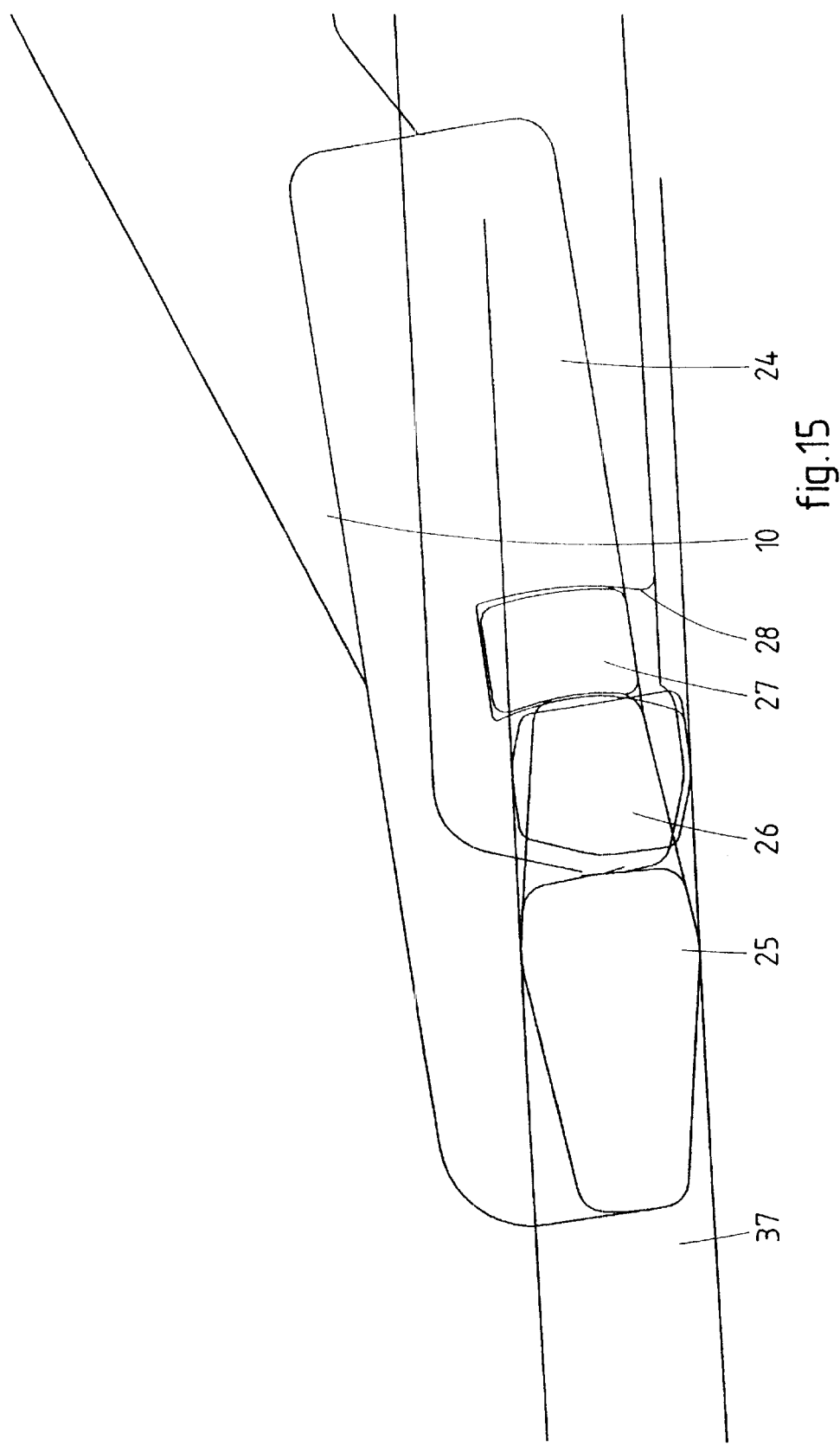

FIGS. 13–15 show that the front surface of locking element 21 abuts against the rear side of sliding shoe 25 in every position. Near the front end of locking element 21 a hinged cam 26 is formed, which also functions as a sliding shoe for the front end of locking element 21 and to guide the front end of locking element 21 in vertical direction. In order to stop the sliding shoe 25 of link plate 10 and the locking element 21 in the opposite direction as well, link plate 10 is provided with a guide cam 27 at least substantially in the form of a segment of a curve or circle, which guide cam is movable in a recess 28 in locking element 21 at least substantially in the form of a segment of a curve or circle (e.g. a hob curve). Both locking element 21 and link plate 10 are capable of pivoting movement with respect to link plate 10 and locking element 21, respectively, via unround sliding shoes.

As result of the aforesaid slope of the locking recess 28, locking element 21 will also be urged slightly rearwards when pivoting downwards during the first upward pivoting movement of panel 4. As a result, also the front sliding shoe 25 and thug panel 4 are moved rearward, thus providing a correction movement for the front side of panel 4 so as to prevent the seal of panel 4 being damaged.

Figure 16:
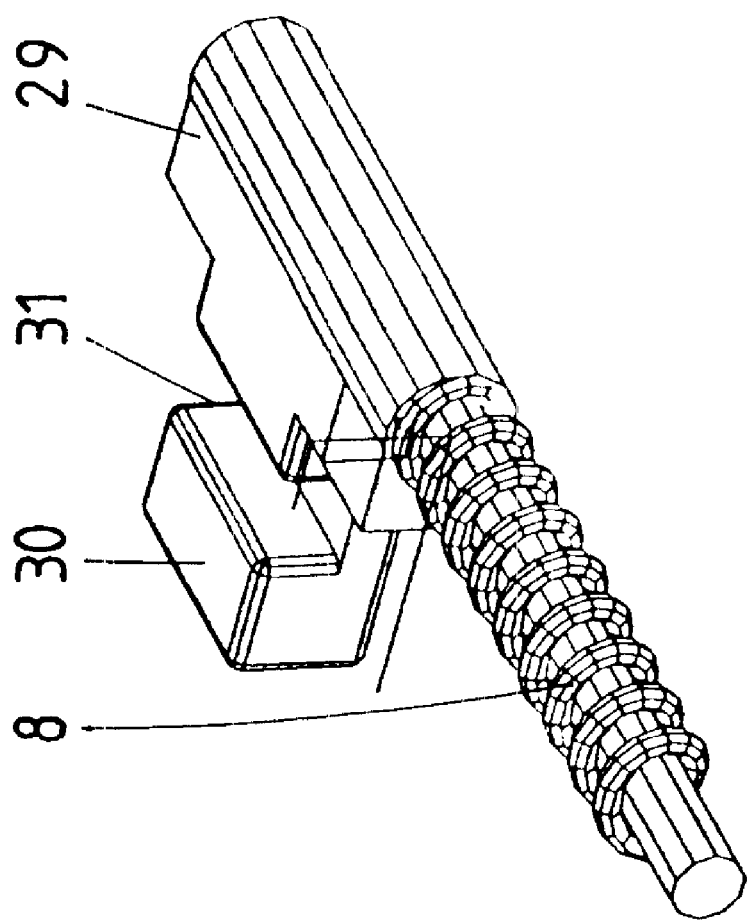
FIG. 16 is a larger-scale perspective top plan view of a connecting part of the driving cable for the operating mechanism of FIG. 2.
Figure 17:
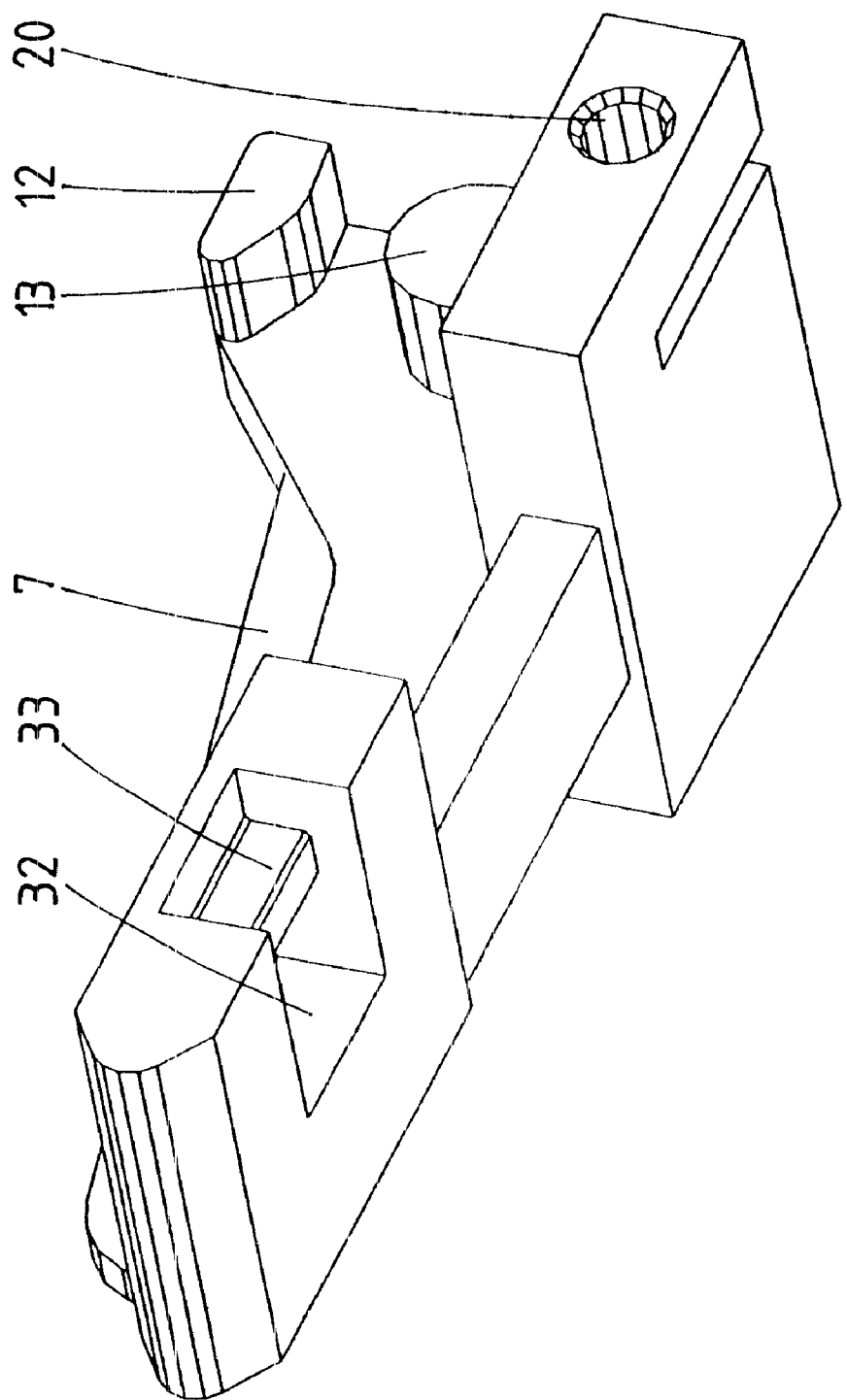
FIG. 17 is a perspective bottom plan view of the part of the operating mechanism of FIG. 12 that cooperates with the driving cable of FIG. 16.

FIGS. 16 and 17 show in more detail slide 7 and the associated driving cable 8, and in particular the mating parts thereof. As can be seen in these figures, a coupling element 29 is formed on the end of cable 8, in particular by forming plastic thereon by means of an injection molding process. Said coupling element 29 is comprised of a laterally projecting block 30, in which a groove 31 that is open on the upper side is formed in the longitudinal direction thereof. Block 30 t its in a recess 32 in the underside of slide 7. Said recess is formed in the front part of slide 7, slightly ahead of the control cam 35 for locking element 21. A rib 33 in recess 32, which extends in the longitudinal direction of guide rail 6, fits in the groove 31 that is present in the coupling element 29 of cable 8. The engagement of block 30 in recess 32 enables the transmission of forces between cable 8 and slide 7 in the longitudinal direction of guide rail 6. As a result of the engagement of rib 33 in groove 31, slide 7 is restrained in lateral direction by cable 8, which is accurately guided in an associated guide groove 34 in guide rail 6. This prevents slide 7 from moving out in lateral direction, for example against locking element 21, which might result in an undesirable (friction increasing) additional lateral pressure on the locking element 21.

An a result of the construction according to the invention a slightly flexible connection is formed between the cable and slide 7, and cable 8 and slide 7 can be manufactured independently of each other and simply be joined outside the guide rail 6, without any special mounting operations being required. Nevertheless, an adequate connection both in longitudinal direction and in transverse direction is formed after being fitted in guide rail 6, while the materials for both parts can be freely selected.

From the foregoing it will be apparent that the invention provides an open roof construction which is remarkable for the simplicity and stability of the construction, which comprises few parts and which is easy to install.

The invention is not limited to the embodiment as described above and shown in the drawing, which can be varied in several ways without departing from the scope of the invention. Thus the locking slot and the locking pin or cam could also be reversed kinematically. Furthermore it is possible to use a pivoting element as a locking element. Furthermore, the invention can be used with open roof constructions having other operating mechanisms such as pin-slot actuators, or lifting mechanisms having link structures or the like.

What is claimed is:

1. An open roof construction for a vehicle having an opening in its fixed roof, the open roof construction comprising:
   a stationary part to be fixed to the fixed roof, wherein the stationary part includes at least one stationary guide rail at the edge of the roof opening, which extends in a longitudinal direction of the vehicle;
   at least one adjustable panel supported by said stationary part, which is adjustable between a closed position, in which it closes the roof opening, and an open position, in which it has been moved rearwards to an upwardly sloping position at least partially above the fixed roof, in which position it opens the roof opening at least partially;
   an operating mechanism for adjusting said panel upwardly and downwardly, the operating mechanism including a driven slide, a link-cam connection and a link attached to the panel and which is adjustably connected to said slide by said link-cam connection, said link-cam connection being provided with a link rib formed on one side of the link and link-cams formed on said slide, wherein the link-cams engage around said link rib, the link being pivotally and slidably supported on a front side with respect to said stationary guide rail, the operating mechanism further comprising a locking mechanism, the locking mechanism including a locking element slidably connected to the link; and
   a connecting arm connected to said driven slide and the locking mechanism and disposed on an opposite side of the link than the link rib, the locking element being locked to the guide rail in the closed position of the panel as a function of the connecting arm and movement of the slide, wherein said connecting arm is movably and pivotally connected to the link, and in that the connecting arm extends at least substantially vertically in the upwardly pivoted position of the panel.

2. The open roof construction according to claim 1, wherein said connecting arm includes a pin guided in a slot formed in said link.

3. The open roof construction according to claim 2, wherein said locking element is connected to the pin of the connecting arm.

4. The open roof construction according to claim 1, wherein the locking element includes a partially vertically extending locking slot near its rear end, with which a locking pin disposed on said stationary guide rail can come into engagement near the closed position of said panel.

5. The open roof construction according to claim 1, wherein said connecting arm is pivotally connected to said slide.

6. The open roof construction according to claim 1, wherein the connecting arm occupies a rearwardly and upwardly inclined position in the closed position of the panel and wherein the connecting arm can be pivoted upwards when the panel is being moved from its closed position, thus acting as a retarding element between said slide and said locking element, as a result of which movement of the slide is converted into a smaller movement of said locking element, at least during part of the actuation of the locking element.

\* \* \* \* \*